United States Patent [19]
Patrick et al.

[11] Patent Number: 5,589,996
[45] Date of Patent: Dec. 31, 1996

[54] METHOD AND APPARATUS FOR CONTROLLING SPINDLE SPEED TO COMPENSATE FOR DRAG IN A DISK DRIVE SYSTEM

[75] Inventors: Paul R. Patrick, Longmont; Walter Wong, Boulder, both of Colo.

[73] Assignee: Seagate Technology, Inc., Scotts Valley, Calif.

[21] Appl. No.: 167,317

[22] Filed: Dec. 13, 1993

[51] Int. Cl.$^6$ .................................................. G11B 19/24
[52] U.S. Cl. .......................................... 360/73.03; 360/71
[58] Field of Search ............................ 360/73.03, 73.02, 360/70, 71, 69, 77.02, 77.04, 77.08, 78.06, 78.07, 78.14; 369/50

[56] References Cited

U.S. PATENT DOCUMENTS

| | | | |
|---|---|---|---|
| 4,979,056 | 12/1990 | Squires et al. | 360/70 |
| 5,087,994 | 2/1992 | Fukushima | 360/73.03 |
| 5,220,551 | 6/1993 | Tateishi et al. | 369/50 |
| 5,270,992 | 12/1993 | Yasuda et al. | 360/73.03 |
| 5,412,629 | 5/1995 | Shirane | 369/50 |
| 5,473,230 | 12/1995 | Dunn et al. | 360/73.03 X |

*Primary Examiner*—Aristotelis Psitos
*Assistant Examiner*—James L. Habermehl
*Attorney, Agent, or Firm*—Oblon, Spivak, McClelland, Maier & Neustadt, P.C.

[57] ABSTRACT

Control system/method for controlling disk spindle motor speed in a disk drive system using transducers riding or flying upon the disks, with a viscous substance between the disks and the transducers thereby exerting a load upon the spindle motor, the load having a non-uniform profile from the disk inner diameter to the outer diameter where the load at any location across the disk is a function of the medium upon which the transducers ride or fly above the disks, the location itself and the physical environment being experienced by the medium at any given instant of time. The control system provides speed control data that defines the power applied to the spindle motor to maintain a desired motor speed as a function of the presently selected track address and a controller that provides and selects for a presently selected track address the speed control data to the spindle control system to maintain the spindle motor speed at the specified speed. The method comprises the steps of: a) generating speed data for maintaining the spindle motor at a specified speed as a function of the track addressed by the disk drive system; b) storing the speed data in a first memory table in the disk drive system; c) retrieving the stored speed data for the track presently being addressed by the disk drive system; and d) providing the retrieved speed data to the speed controller for controlling the spindle motor speed.

10 Claims, 4 Drawing Sheets

METHOD AND APPARATUS FOR CONTROLLING SPINDLE SPEED TO COMPENSATE FOR DRAG IN A DISK DRIVE SYSTEM

CROSS-REFERENCE TO RELATED PATENTS

The following U.S. patent is assigned to the assignee of the present application, is related to the present application and its disclosure is incorporated herein by reference:

U.S. Pat. No. 4,979,056 issued Dec. 18, 1990, to Squires et al., and entitled DISK DRIVE SYSTEM CONTROLLER ARCHITECTURE.

BACKGROUND OF THE INVENTION

1. Field of the Invention

The present invention relates to disk drive systems and, more specifically, to an apparatus and method for controlling the spindle speed to compensate for drag on the spindle motor.

2. Description of the Related Art

In a disk drive system, the disks are connected to a spindle which is rotated by a spindle motor. The transducer heads are loaded onto an air bearing which is caused by the rotation of the disks. The transducer's height above the disk is a function of the downward force produced by the spring tension of the head arm assembly in opposition to the upward forces caused by the air bearing itself. It is desired to fly the transducer as close as possible to the disk surface without physical contact with the disk to prevent damage to the disk and the transducer.

As technology has improved, the flying height of the transducer above the disk has been decreased to the point where the use of air as the media for the interface between the transducer and the disk is the limiting factor. The distance that the transducer flies above the disk is a factor that determines the track density that can be used on the disk and, therefore, how much data can be stored on the disk.

Attempts have been made to use other substances to coat the disk surface and to be the interface between the transducer and the disk. These attempts have identified viscous substances for coating a disc which will allow the transducer to fly closer to the disk surface than using air as the interface substance between the transducer and the disk.

When viscous substances are used a non uniform drag profile across the useable area of the disk is experienced. This non uniform drag profile is caused by the transducers interacting with the viscous substances to produce a drag on the disk which places a load upon the spindle motor which is greater than when air is used as the interface substance. Further, the magnitude of the drag increases from the inner diameter to the outer diameter of the recording area on the disk. The magnitude of the drag is also a function of the environment of the viscous substance whose viscosity will vary as a function of temperature and humidity on the recording media.

It has been found that under some circumstances, such as a light weight disk having low inertia, that the drag profile of an air bearing may be sufficiently non uniform, across the useable disk surface, to cause the same problem experienced with the use of viscous substances to coat the disk.

Disk drive systems employ a sector servo system to control the placing and maintaining of the transducers at specific tracks on the disk. The sector servo system requires each track to be divided into a fixed number of sectors and information is recorded at the beginning of each sector, including a sector mark indicating the start of the sector, servo data used to control the position of the transducer with respect to the center of the track, and identification data which identifies the track and sector.

Many disk drive systems used the recorded sector mark to determine the rotational velocity of the disk and to adjust the speed of the spindle motor such that the measured rotational velocity is maintained at a specified operational rotational velocity. The rotational speed of the disks is determined by measuring the time between detection of adjacent sector marks on a track by the spindle speed control system.

When the disk drive system performs a seek operation the transducers are moved from one track to another track on the disk. A seek algorithm is used to control the movement of the transducers from the present track to the newly designated track. Basically, the seek operation counts the number of tracks that are being crossed by the magnetic transducer as it moves across the recording surface of the recording media by sensing the servo information recorded on each track. When the transducer arrives at the new track, synchronization is obtained by use of the sector marks, the servo data and the identification data track. The track seeking procedure may employ a table of ideal velocity curves for efficiently controlling the time required for the actuator to move the transducer to the desired location. Each ideal velocity curve represents the ideal velocity profile for the actuator for movement of the transducer over a specific distance, the number of tracks. The system selects the ideal velocity curve which best matches the number of tracks to be crossed in the seek operation.

When a seek operation is performed in a disk drive systems having a non uniform drag profile, such as those employing viscous substances to coat the disks, the magnitude of the change in the drag experienced by the spindle motor can be such that the speed of the spindle motor will either increase or decrease to such a degree that the spindle speed control system cannot recover from the change in speed. This condition prevents the disk drive system from successfully performing a long seek operation.

SUMMARY OF THE INVENTION

Accordingly, it is an object of the present invention to provide an apparatus and method which will compensate for a non uniform drag profile.

Accordingly, it is an object of the present invention to provide an apparatus and method which will compensate for a non uniform drag profile caused by the viscous substance used to coat the disks.

Another object of the invention is to provide an apparatus and method for compensating for changes in the viscosity of a viscous substance used to coat the disk due to changes in the environment of the viscous substance.

Finally, another object of the present invention is to provide an apparatus and method for allowing long seek operations to be successfully performed when a the system present a non uniform drag profile.

Briefly, the invention divides the tracks on the disk into ten zones, where each zone contains 128 tracks. A first table is constructed to store the length of the duty cycle of a power pulse for each zone to be used with a pulse modulated spindle motor such that the disks will be rotated at the specified rotational velocity when the transducer is located at a track within a given zone. When the spindle speed control system indicates a correction to the duty cycle for the spindle motor, that correction is applied to the stored duty cycle in the first table for that zone thereby compensating for changes in the drag profile, for example changes in viscosity of a viscous substance coating the disk due to changes in environmental conditions. The algorithm for controlling the actuator for moving the transducers is altered such that the time required for moving the transducers is increased by 10% to allow long seek operations to be performed successfully. When a seek operation is received by the disk drive system, a test is performed to determine if the seek operation is a long seek, that is greater than 32 tracks. If a long seek operation is determined, the stored duty cycle for the zone containing the address of the track, to which the transducers are to be moved, is applied to pulse modulated spindle motor during the seek operation until the seek operation can successfully read the sector marks from the new track. Once the seek operation can read the sector marks of the newly addressed track, the disk drive system switches to the spindle speed control system for controlling the speed of the spindle motor.

Where a viscous substance is used to coat the disk, the drag profile the same viscous substance may vary among disk drive systems. Thus a first table of duty cycles must be generated whenever the disk drive system is powered on or an initial table of duty cycles must be generated and stored in a nonvolatile memory within the disk drive and then copied to the first table and then the first table is updated for each zone before the disk drive system is deemed ready for operation after the disk drive system is powered on.

An advantage of the system and method of the invention is that compensation for the drag placed on the spindle motor caused by the non uniform drag profile of the substance acting as the bearing upon which the magnetic transducer rides is provided such that the spindle's rotational velocity will be maintained within the desired limits of the specified rotational velocity regardless of the position of the transducer.

BRIEF DESCRIPTION OF THE DRAWINGS

The invention will be described with respect to the particular embodiments thereof and reference will be made to the drawings, in which.

DESCRIPTION OF THE PREFERRED EMBODIMENTS

This invention will be described for use in a disk drive system that embodies the controller architecture as described in U.S. Pat. No. 4,979,056 entitled DISK DRIVE SYSTEM CONTROLLER ARCHITECTURE. This architecture includes a sector task which is processed for each sector. The sector task will cause a power pulse to be applied to the pulse modulated DC spindle motor, enabling a sector mark search and, lastly, will calculate the length of the next power pulse to be applied during the next sector task.

Figure 1:
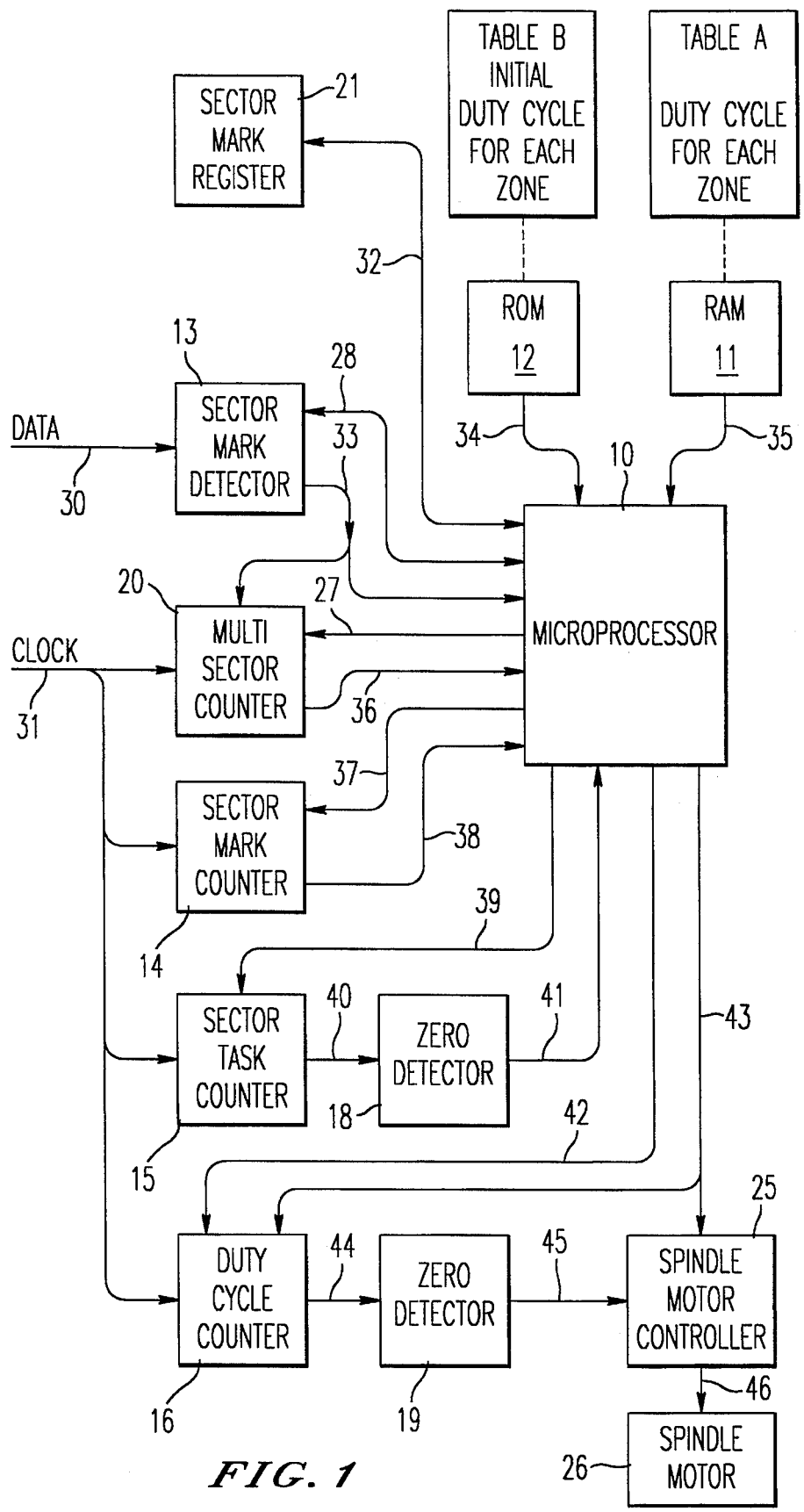
FIG. 1 is a logic diagram of the apparatus for carrying out the invention.

FIG. 1 is the logic components used within the disk drive system to carry out the invention. The disk drive system is controlled by microprocessor 10 which provides timing signals and sequences, and processes tasks during each sector period. A sector period is defined as the time between two adjacent sector marks on the same track. Associated with microprocessor 10 is a nonvolatile memory ROM 12 and a volatile memory RAM 11. The nonvolatile memory may be made of flash memory chips such that microprocessor 10 may write into the flash memory a limited number of times.

Microprocessor 10 provides an enable signal via line 28 to the sector mark detector 13 such that the sector mark detector 13 will search the incoming data on line 30 for a sector mark. When sector mark detector 13 detects the sector mark it provides a sector signal on line 33 to microprocessor 10 and multi-sector counter 20. Sector mark counter 14 counts the number of clock pulses appearing on line 31 between adjacent sector marks. The output of the sector mark counter 14 is provided via line 38 to microprocessor 10. The sector mark counter is reset to zero by a signal on line 37 from microprocessor 10. The count of sector mark 14 is stored by microprocessor 10 in sector mark register 21 via line 32 such that microprocessor 10 will have the previous sector length stored in sector mark register 21 to compare with the present sector mark count contained in sector mark counter 14. Sector mark register 21 may be a register within RAM 11

Sector task counter 15 is stepped downward by the clock pulses appearing on line 31. Sector counter 15 is set to initial count via line 39 by microprocessor 10 to define when a sector task should be undertaken during a sector period. The output of sector counter 15 is connected via line 40 to a zero detector 18. Zero detector 18 generates a sector task interrupt signal on line 41 to microprocessor 10 when sector task counter 15 reaches a count of zero. A sector interrupt signal causes microprocessor 10 to begin processing the sector task.

The system has a non uniform drag profile due the disks being coated with a viscous substance upon which the magnetic transducer rides of flies. The magnetic disk is comprised of 1,280 tracks divided into 10 zones, each zone containing 128 tracks. The disk drives include an inner diameter crash stop. When the disk drive is brought up to speed, the transducers are located against the crash stop and read the sector marks prerecorded in the inner diameter crash stop track.

The disk drive system includes a spindle speed control system for controlling the speed of spindle motor 26 and thereby the rotational speed of the recording disks attached to the spindle. A first and second correction process in the spindle speed control system is used to generate correction values to the duty cycle then being applied to spindle motor 26 to control the speed of spindle motor 26.

A sector task is initiated by the sector interrupt signal generated by detector 18 detecting a zero in sector counter 15. Microprocessor 10 processes the sector task. The sector task determines when the next sector task process should be started and loads the count value via line 39 into sector counter 15 such that a sector interrupt signal will be generated by zero detector 18 at the desired time. The sector mark task will cause a power duty cycle to be applied to the spindle motor 26 by issuing a start signal on line 43. Duty cycle counter 16 contains the duty cycle count value as determined by the previous sector task. The start signal on line 43 will cause spindle motor controller 25 to begin applying power to spindle motor 26 and will condition duty cycle counter 16 to be counted down by clock pulses on line 31. When duty cycle counter 16 reaches zero the duty cycle counter is not conditioned again until the next start signal is generated on line 43. Zero detector 19 senses the zero condition of duty cycle counter 16 and generates a stop signal on line 45 to spindle motor controller 25. Spindle motor controller 25 will turn off the power to spindle motor 26 in response to the stop signal. The sector task conditions the sector mark detector 13 via line 28 to search for a sector mark.

The first correction process generates for each sector a correction value for the duty cycle of plus or minus one count to the duty cycle count stored in Table A and the corrected duty cycle count is then stored in duty cycle counter 16 via line 42 to be used during the next sector task. When a sector mark signal is generated by sector mark detector 13, the count of sector mark counter 14 is compared to the sector period count for the previous sector period stored in sector mark register 21 and sector mark counter 14 is reset to zero. If the value of the count in sector mark counter 14 is greater than the sector count value stored in sector mark register 21, then the rotational speed of the disks has increased and the spindle motor should be slowed by shorting the duty cycle for applying power to spindle motor 25. The sector task will subtract a count of one from the duty cycle count stored for the zone containing the presently addressed track and will store, via line 42, the adjusted duty cycle count value in duty cycle counter 16 after zero detector issues a stop signal on line 45. If the value of the count in sector mark counter 14 is less than the sector count value stored in sector mark register 21, then the rotational speed of the recording disks has decreased and the spindle motor's speed should be increased by increasing the length of the duty cycle applying power to spindle motor 25. The sector task will add a count of one to the duty cycle count stored for the zone containing the presently addressed track and will store via line 42 the adjusted duty cycle count value in duty cycle counter 16 after zero detector issues a stop signal on line 45. Duty cycle counter 16 will contain the duty cycle count to be used during the next sector task.

The second correction process generates, for every two revolution of the disc, a correction for the duty cycle stored in Table A for the zone containing the presently addressed track. The correction factor of plus or minus a one count is applied to the duty cycle stored in Table A for the zone containing the presently addressed address, and the corrected duty cycle is stored in Table A in place of the previous duty cycle. The duty cycle stored in Table A is used by the first correction process.

Each track on the disks is divided into 40 sectors. In the second correction process microprocessor 10 will measure the time for 20 consecutive sectors by means of multisector counter 20 and compares the measured time against a reference time for 20 consecutive sectors when the recording disks are rotating at the specified rotational speed which is stored in ROM 12. The measurement is made four consecutive times covering 80 sectors, that is two full revolutions of the disks. If all four measured rotational speeds were greater than the reference rotational speed, a count of one is subtracted from the duty cycle count stored in Table A for the zone containing the presently addressed track and the adjust duty cycle count is stored in Table A as the duty cycle for the zone containing the presently addressed track. If all four measured rotational speeds were less than the reference rotational speed, a count of one is added to the duty cycle count stored in Table A for the zone containing the presently addressed track and the adjusted duty cycle count is stored in Table A as the duty cycle for the zone containing the presently addressed track. The second correction process corrects for changes in the viscosity of the viscous substance coating the disks due to changes in the environment.

Figure 2:
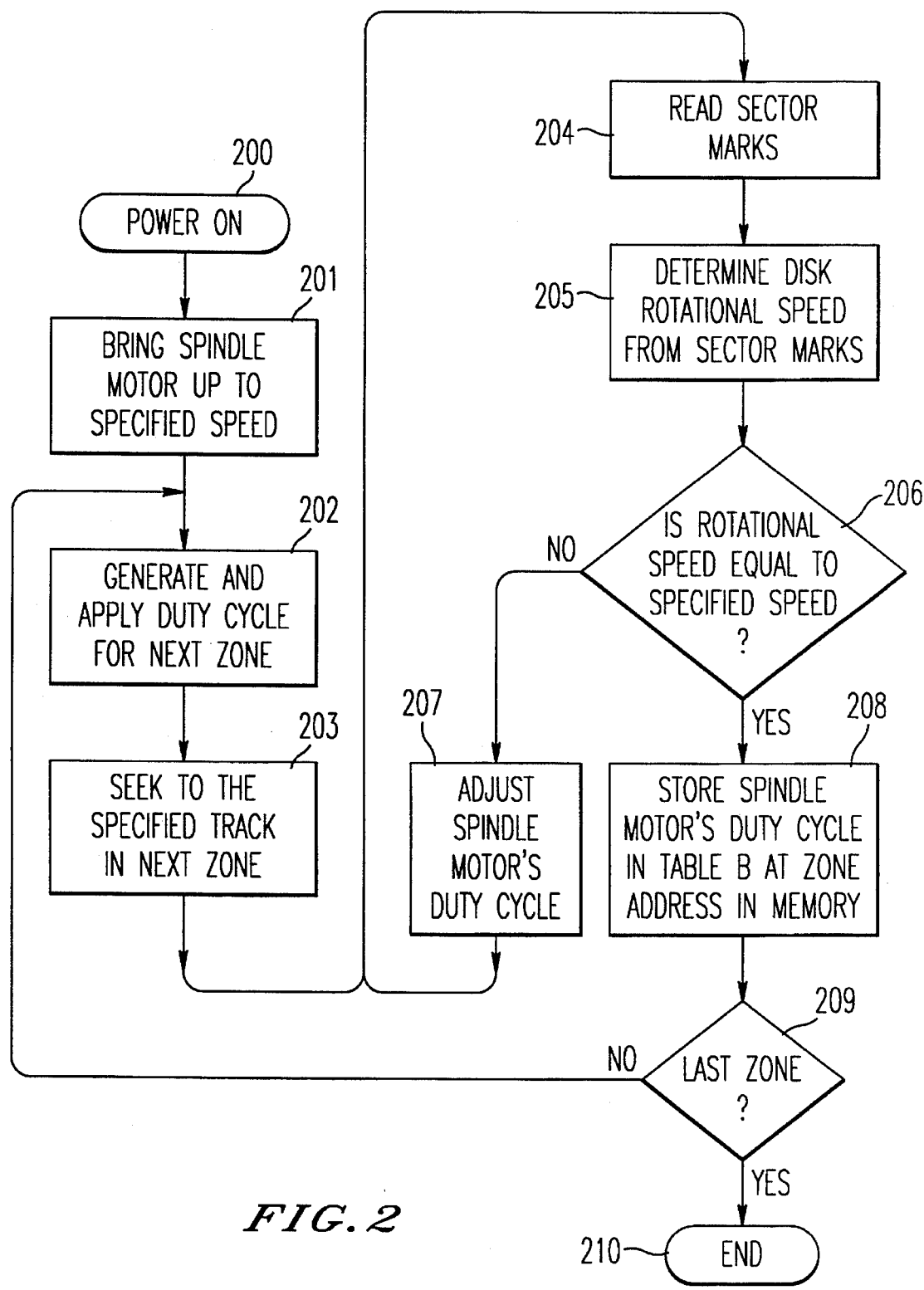
FIG. 2 is a flow chart for the initial build table routine for determining the values of the duty cycle for each zone to be stored in the nonvolatile memory.

Table B stores an initialization duty cycle count for each zone and is stored in ROM 12. Table A stores a working duty cycle count for each zone to be used after the system is initialized and is stored in RAM 11. In a preferred embodiment an initial Table B is initially built and stored in a nonvolatile memory within each disk drive system during the manufacturing process. This results in a decrease of the time required to initialize the disk drive system when power is turned on to the disk drive system. FIG. 2 shows the initial build table routine which is used to determine the count values for each duty cycle for each zone which is to be stored in the nonvolatile memory.

In step 200 power is turned on and then in step 201 the spindle motor is brought up to speed with the head arm assembly located against the inner diameter crash stop. In step 202 an initial value for the duty cycle is determined for use during the seek operation to move the transducer to the next zone. One method for generating the duty cycle is to modify the present duty cycle for use during the next seek operation. The modification may consist of multiplying the present duty cycle by a constant such that the duty cycle will be nonlinearly increased as the transducers are moved outwardly through the zones. The constant is a function of the viscosity characteristics of the viscous substance used and would have to be empirically obtained. This procedure, while not using the optimum duty cycle for each zone, will allow the routine's seek operations to be successfully performed. In step 203 a seek operation is performed to move the head arm assembly to a track in the next zone. The zones are processed from the zone closest to the inner diameter sequentially to the zone closest to the outer diameter. The track used within the preferred embodiment in each zone is the eighth track closest to the outer diameter of the zone. The sector marks are read in step 204 and the system determines the rotational speed from the sector marks in step 205 which is compared to the specified speed in step 206. In step 207, if the rotational speed is too slow, the duty cycle is increased and if the rotational speed is too fast, the duty cycle is decreased. In the preferred embodiment the duty cycle count is increased by a count of one each time an adjustment is made to the duty cycle in a direction as indicated by the error in the rotational speed, as determined in step 206. Steps 204, 205, 206 and 207 are repeated until step 205 determines that the rotational speed equals the specified speed. Upon this occurrence the system in step 208 will store the present spindle motor duty cycle count in Table B for the zone being processed. In step 209, if the zone processed was not the zone adjacent to the outer diameter of the recording area of the disks, the routine branches to step 202 to process the next zone. The routine ends at step 210 when all zones have been processed.

Figure 3:
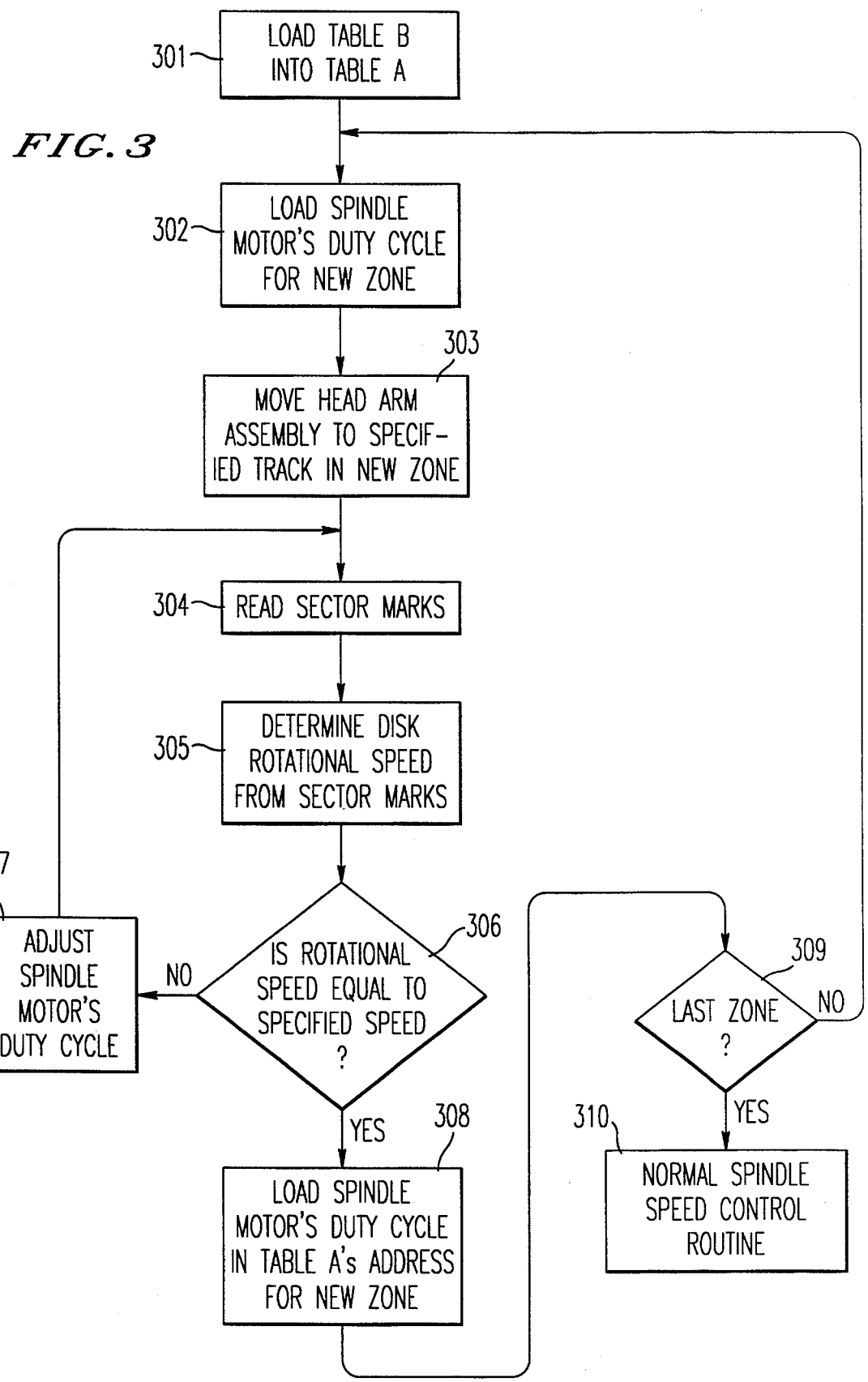
FIG. 3 is a flow chart for the process to initialize the table in the volatile memory for providing accurate duty cycles for each of the zones.

When the disk drive system is turned on, part of the initialization procedure is shown in FIG. 3. At step 301 Table B is loaded from ROM 12 into Table A in RAM 11. In that Table B was generated in the factory and since the conditions being experienced by the viscous substances on the disk may have changed from the environment in which Table B was generated, the systems will check the duty cycle for each of the zones now stored in Table A and, if they are not correct for the present environment, correct the duty cycles for the present environment. The system will load the spindle motor duty cycle for the zone closest to the inner diameter and then give a seek command to move the head arm assembly to the same track that was used to generate the duty cycle stored in Table B, to wit the eighth track from the outer diameter of the zone being used. The sector marks are then read in step 304 and the disk rotational speed is determined in step 305. The rotational speed is then compared to the specified speed in step 306 and, if the rotational speed is not equal to the specified speed, an adjustment is made to the spindle motor duty cycle in step 307. Once again the adjustment to the duty cycle is made in increments of a count of one to generate a new motor duty cycle to correct for the error in the speed of the rotational disk. When step 306 determines that the rotational speed is equal to the specified speed, the present duty cycle is stored in Table A for the zone that has been processed. Step 309 determines if the last zone has been processed and, if not, the system will return to step 302 which will load the duty cycle for the next zone to be processed into the system and move the head arm assembly to the specified track within that new zone in step 303. The process is repeated until the last zone has been processed and detected in step 309, and then the system will enter into the spindle speed control system as previously discussed.

Figure 4:
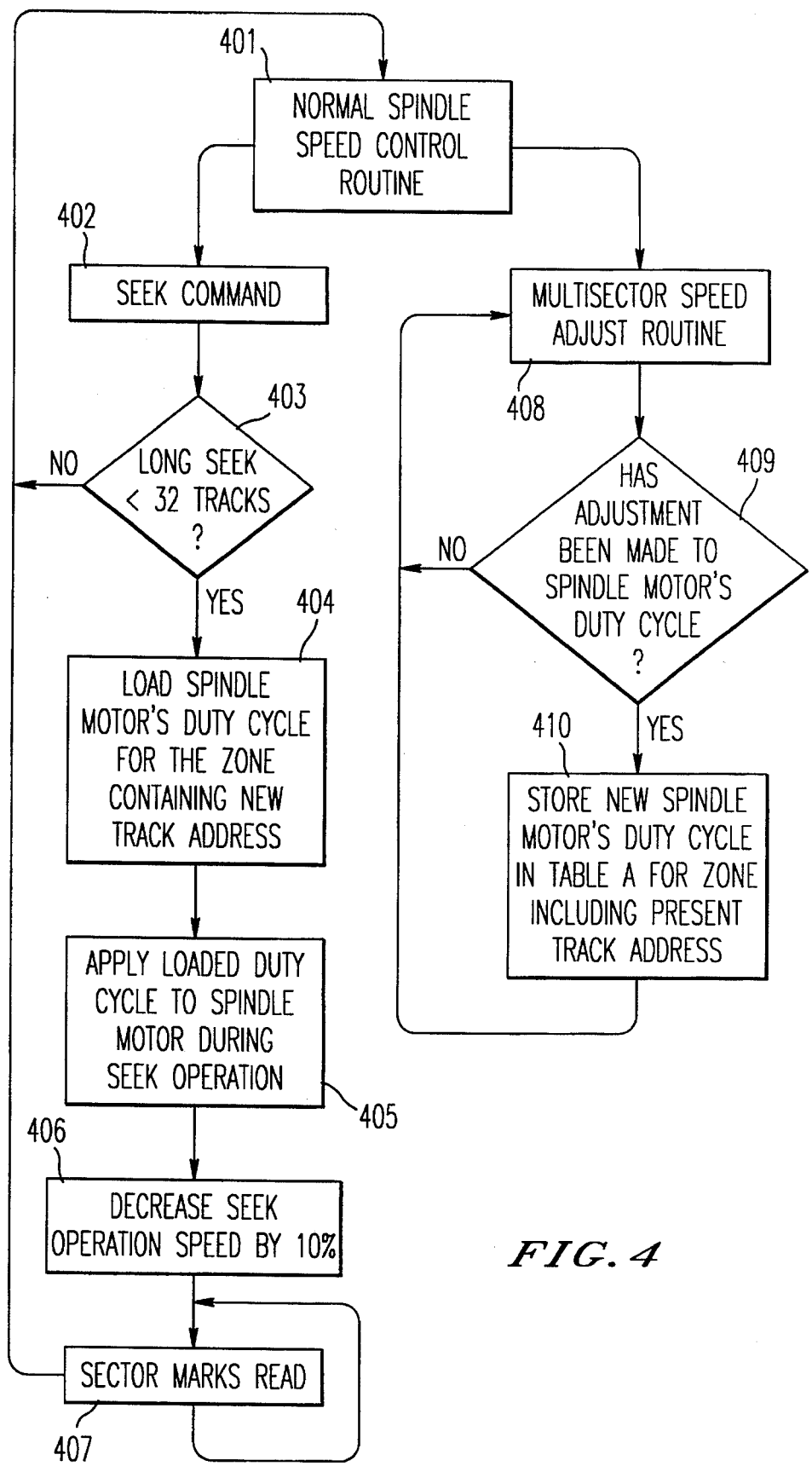
FIG. 4 is the operating routine employed by the disk drive system illustrating the steps to be taken during long seek operations and ongoing corrections to the duty cycles stored in the table in the nonvolatile memory.

Referring to FIG. 4, as previously discussed, a second correction process is performed during the spindle speed control system which will update the duty cycle count stored in Table A whenever a correction is made to the duty cycle count by the second correction process of the spindle speed control system. This is demonstrated in steps 408, 409 and 410.

When the seek command is sensed in step 402, a test is made by step 403 to determine whether this seek command is a long seek. A long seek has been determined to be a seek of more than 32 tracks. If the seek command is not a long seek, the spindle speed control system is used to control the speed of spindle motor 26 during the seek operation. It has been found that even if the movement of 32 tracks would cross a zone barrier, the distance is short enough that the change in drag will not be large enough to cause the seek command to lose synchronization during the seek command, and the first and second correction procedures will automatically access the new zone's duty cycle when the seek operation is completed. If a long seek is determined by step 403, the system will load the spindle motor duty cycle for the zone containing the new track address into duty cycle counter 16 in step 404 and will continuously use that duty cycle during the seek command procedure, step 405, until the transducers can read the sector marks of the newly addressed track, step 407.

Also, as previously described, the time necessary for performing the seek operation is increased by 10% in all seek operations. While the change in speed of the seek operation is not necessary in seeks of less than 32 tracks, in the preferred embodiment the speed change is used in short seeks because it makes the seek command procedure easier to implement.

In some engineering situations there may not be enough space available in the volatile memory to store Table B. If such is the case, then Table A can be generated in the same manner as Table B was generated in FIG. 2 each time power is applied to the disk drive system. The change that would be made would be that the duty cycles for each of the zones would be stored in Table A within RAM 11. This table would have the same values for the duty cycle that would have been generated by the initial Table A routine of FIG. 3. Therefore, the initialization build table routine of FIG. 2 would have effectively built Table A within the RAM memory to be used during the operation of the system. The value of the constant to be used for generating the duty cycles during the table build routine would have to be stored within ROM 12 for use by the system. The disadvantage of building the table routine by FIG. 2 each time power is turned on is that it takes longer to build Table B of FIG. 2 than to update Table A of FIG. 3. However, this is an engineering trade-off between the overall operational speed of the system during initialization and the cost of having a larger nonvolatile memory.

While the invention has been particularly shown and described with reference to the preferred embodiments thereof, it will be understood by those skilled in the art that changes in form and detail may be made therein without departing from the spirit and scope of the invention. Given the above disclosure of general concepts and specific embodiments, the scope of the protection sought is defined by the following claims.

What is claimed is:

1. A control system for controlling the speed of a spindle motor for rotating disks in a disk drive system at a constant speed where the transducers ride or fly upon a medium between said disks and said transducers thereby exerting a load upon said spindle motor, said load having a non uniform profile across the disks from the inner diameter to the outer diameter of said disks where said load at any location across said disk is a function of the type of medium upon which said transducers ride or fly above said disks, said location itself and the physical environment being experienced by said medium at any given instant of time, said disk drive system comprising disks having a plurality of concentric addressable tracks between said inner and outer diameters of said disks, a positioning and track following system for moving said transducers to an addressed track on said disk and for maintaining said transducers' position with reference to the presently addressed track, read/write means connected to said transducers for reading or writing data from or to said disks, said control system comprising:

each of said tracks is divided in sectors;

storage means for storing for each said addressable track initial speed control data, said initial speed control data for an addressable track including a power setting which includes compensation for said load exerted on said spindle motor by said transducers at said addressable track for defining the power to be applied to said spindle motor to maintain said spindle motor at said constant speed; and control means for applying the power indicated by said initial speed control data for said addressed track for maintaining said speed of said spindle motor at said constant speed, said control means during each sector alters a present power setting of a present sector to form an altered power setting by a correction factor to change the speed of said spindle motor towards said constant speed if said speed of said spindle motor was not at said constant speed where said altered power setting becomes said present power setting and is used for a next sector to occur immediately following said sector generating said altered power setting.

2. The control system of claim 1 wherein said spindle motor in said disk drive system is a pulse modulated DC motor and said initial speed control data defines the length of the power pulse, the duty cycle, that is to be applied to said spindle motor.

3. A control system for controlling the speed of a spindle motor for rotating disks in a disk drive system where the transducers ride or fly upon a medium between said disks and said transducers thereby exerting a load upon said spindle motor, said load having a non uniform profile across the disks from the inner diameter to the outer diameter of said disks where said load at any location across said disk is a function of the type of medium upon which said transducers ride or fly above said disks, said location itself and the physical environment being experienced by said medium at any given instant of time, said disk drive system comprising disks having a plurality of concentric addressable tracks between said inner and outer diameters of said disks, a positioning and track following system for moving said transducers to an addressed track on said disk and for maintaining said transducers' position with reference to the presently addressed track, read/write means connected to said transducers for reading or writing data from or to said disks, said control system comprising:

each of said tracks is divided in sectors;

storage means for storing for each said addressable track speed control data, said speed control data including a power setting for defining the power to be applied to said spindle motor to maintain said spindle motor at a desired speed as a function of said track addresses;

control means for applying the power indicated by said speed control data for said addressed track for maintaining said speed of said spindle motor at said specified speed and said control means during each sector alters the present power setting to form an altered power setting by a correction factor to change the speed of said spindle motor towards said desired speed if said speed of said spindle motor was not at said desired speed where said altered power setting is used for a next sector to occur immediately following said sector generating said altered power setting wherein said control means further comprising:

signal means for generating a first signal when said control means senses that the speed of said spindle motor has constantly been fast or slow for a designated period of time; and correction means in response to said first signal for generating new speed control data for said presently selected track that would tend to correct the speed of said spindle motor and for storing said new speed control data in said storage means in place of said currently used speed control data for said addressed track.

4. A control system for controlling the speed of the spindle motor for rotating disks in a disk drive system at a constant speed where the transducers ride or fly upon a medium between said disks and said transducers thereby exerting a load upon said spindle motor, said load having a non uniform profile across the disks from the inner diameter to the outer diameter of said disks where said load at any location across said disk is a function of the type of medium upon which said transducers ride or fly above said disks, said location itself and the physical environment being experienced by said medium at any given instant of time, said disk drive system comprising disks having a plurality of concentric addressable tracks between said inner and outer diameters of said disks, a positioning and track following system for moving said transducers to an addressed track on said disk and for maintaining said transducers' position with reference to the presently addressed track, read/write means connected to said transducers for reading or writing data from or to said disks, said control system comprising:

each of said tracks is divided in sectors;

said tracks grouped into zones;

Storage means for storing initial zone speed control data for each said zone, said initial zone speed control data for a zone includes a power setting which compensates for said load on said spindle motor by said transducers located within said zone for defining the power to be applied to said spindle motor for said zone to maintain said spindle motor at said constant speed; and control means for applying the power indicated by said initial zone speed control data for a zone containing an addressed track for maintaining said speed of said spindle motor at said constant speed, said control means during each sector alters a present power setting, for the zone containing the addressed track, to form an altered power setting by a correction factor to change the speed of said spindle motor towards said constant speed if said actual speed of said spindle motor was not said constant speed where said altered power setting becomes said present power setting and is used for a next sector in said track in said zone to occur immediately following said sector generating said altered power setting.

5. A control system for controlling the speed of the spindle motor for rotating disks in a disk drive system where the transducers ride or fly upon a medium between said disks and said transducers thereby exerting a load upon said spindle motor, said load having a non uniform profile across the disks from the inner diameter to the outer diameter of said disks where said load at any location across said disk is a function of the type of medium upon which said transducers ride or fly above said disks, said location itself and the physical environment being experienced by said medium at any given instant of time, said disk drive system comprising disks having a plurality of concentric addressable tracks between said inner and outer diameters of said disks, a positioning and track following system for moving said transducers to an addressed track on said disk and for maintaining said transducers' position with reference to the presently addressed track, read/write means connected to said transducers for reading or writing data from or to said disks, said control system comprising:

said tracks grouped into zones;

each of said tracks is divided in sectors;

storage means storing zone speed control data for each said zone, each said zone speed control data including a power setting for defining the power to be applied to said spindle motor for said zone to maintain said spindle motor at a specified speed;

control means for applying the power indicated by said speed control data for a zone containing an addressed track for maintaining said speed of said spindle motor at said specified speed and said control means during each sector alters the present power setting, for the zone containing the addressed track, to form an altered power setting by a correction factor to change the speed of said spindle motor towards said desired speed if said actual speed of said spindle motor was not said specified speed where said altered power setting is used for a next sector in said zone to occur immediately following said sector generating said altered power setting, wherein said control means includes:

signal means for generating a first signal when said control means senses that the speed of said spindle motor has constantly been fast or slow for a designated period of time; and correction means in response to said first signal for generating new zone speed control data for said presently selected zone that would tend to correct the speed of said spindle motor and for storing said new zone speed control data in said storage means in place of said currently used zone speed control data containing said addressed track.

6. The control system of claim 5, where said disk drive system employs a pulse modulated DC spindle motor and said concentric tracks are divided into sectors, wherein:

said storage means stores zone speed control data containing said power setting which defines the width of the power pulse, the duty cycle, that is applied to said spindle motor; and said control means determines during the time each said sector is being processed, by said transducers, if said correction factor is to be applied to said current zone power setting for use during the next said sector to be processed and said designated period of time is defined as the time necessary for n sectors to be processed.

7. A spindle speed control system for controlling the speed of a spindle motor in a disk drive system, said spindle speed control system comprising:

storage means for storing for each track address in said disk drive system a power setting for defining the power to be applied to said spindle motor to maintain said spindle motor at a specified speed; and control means for retrieving a power setting for a track presently being addressed by said disk drive system and for applying power to said spindle motor in accordance with said retrieved power setting for maintaining said speed of said spindle motor at said specified speed and wherein said control means further includes;

first correction means for
a) generating a first correction factor for each of a plurality of time periods occurring during each revolution of disks of said disk drive system where said first correction factor has a constant positive value if the speed of said spindle is slow and a constant negative value if the speed of said spindle is fast; and
b) for generating a temporary power setting by adding said first correction factor to said retrieved power setting to change the speed of said spindle motor towards said specified speed;

signal means for generating a first signal when the speed of said spindle motor has constantly been fast or slow for one or more revolutions of disks in said disk drive system; and second correction means in response to said first signal for:
a) generating a second correction factor where said second correction factor has a constant positive value if the speed of said spindle is slow and a constant negative value if the speed of said spindle is fast,
b) for adding said second correction factor to said retrieved power setting to form a new power setting for said track presently being addressed by said disk drive system to change the speed of said spindle motor toward said specified speed; and
c) for storing said new power setting speed control data in said storage means to replace said power setting for said track being addressed where thereinafter said first correction means will use said new power setting.

8. The spindle speed control system of claim 7 wherein said initial power setting defines the length of a power pulse applied to said spindle motor where said spindle motor is a pulse modulated DC motor.

9. A spindle speed control system for controlling the speed of a spindle motor in a disk drive system, said spindle speed control system comprising:

storage means for storing for each zone a power setting for defining the power to be applied to said spindle motor to maintain said spindle motor at a specified speed where a zone is comprised of a group of track addresses of tracks on said disks in said disk drive system; and control means for retrieving a power setting for a zone containing a track presently being addressed by said disk drive system and for applying power to said spindle motor in accordance with said retrieved power setting to maintain said speed of said spindle motor at said specified speed wherein said control means further includes;

first correction means for:
a) generating a first correction factor for each of a plurality of time periods occurring during each revolution of said disks where said first correction factor has a constant positive value if the speed of said spindle is slow and a constant negative value if the speed of said spindle is fast; and
b) for generating a temporary power setting by adding said first correction factor to said retrieved power setting to change the speed of said spindle motor towards said specified speed;

signal means for generating a first signal when the speed of said spindle motor has constantly been fast or slow for one or more revolutions of said disks; and second correction means in response to said first signal for:
a) generating a second correction factor where said second correction factor has a constant positive value if the speed of said spindle is slow and a constant negative value if the speed of said spindle is fast;
b) for adding said second correction factor to said retrieved power setting to form a new power setting for said zone containing said track presently being addressed by said disk drive system to change the speed of said spindle motor towards said specified speed; and
c) for storing said new power setting speed control data in said storage means to replace said power setting for said zone containing said track presently being addressed where thereinafter said first correction means will use said new power setting.

10. A method for controlling the speed of a spindle motor at a constant speed in a disk drive system comprising the steps of:

a) initializing said disk drive system by the steps of:
i) generating an initial zone power setting for each zone, where a zone includes a plurality of addressable tracks in said disk drive system and a power setting defines the power necessary to be applied to said spindle motor to cause said spindle motor to operate at said constant speed and where said initial zone power setting for a zone includes compensation for said load exerted on said spindle motor by said transducers located within said zone;
ii) storing all said initial zone power settings in a first table in a non-volatile memory;
iii) transferring said first table from said non-volatile memory to said volatile memory means;
iv) determining for each zone the speed of said spindle when said initial zone power setting for a zone is provided to control means and said transducers are located at a track within said zone;

v) generating for each zone where said speed of spindle motor was not at said constant speed as determined by step iv a new zone power setting for said zone such that said spindle motor will operate at said constant speed; and vi) storing for each zone said new zone power setting generated by step v to replace said zone power setting stored in said first table in said volatile memory for said zone;

b) controlling the speed of said spindle motor during operation of said disk drive system by the steps of:

i) retrieving from said non-volatile memory said stored initial zone power setting for a zone containing a track being addressed by said disk drive system;

ii) providing said initial zone power setting to a speed control means which controls the speed of said spindle motor;

iii) generating a new zone power setting for said zone containing a presently addressed track when the spindle speed is sensed as being slow or fast continuously for one or more revolutions of said disks; and iv) storing said new zone power setting for said zone in said first table in place of said initial zone power setting for said zone.

* * * * *